(12) United States Patent
Sekiguchi

(10) Patent No.: US 9,527,354 B2
(45) Date of Patent: Dec. 27, 2016

(54) TIRE REPAIR FLUID CONTAINER PACKAGING BOX AND METHOD OF INJECTING TIRE REPAIR FLUID

(71) Applicant: The Yokohama Rubber Co., LTD., Minato-ku, Tokyo (JP)

(72) Inventor: Takumi Sekiguchi, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 128 days.

(21) Appl. No.: 14/390,708

(22) PCT Filed: Feb. 28, 2013

(86) PCT No.: PCT/JP2013/055288
§ 371 (c)(1),
(2) Date: Oct. 3, 2014

(87) PCT Pub. No.: WO2013/150842
PCT Pub. Date: Oct. 10, 2013

(65) Prior Publication Data
US 2015/0047737 A1    Feb. 19, 2015

(30) Foreign Application Priority Data

Apr. 4, 2012  (JP) .................................. 2012-085771

(51) Int. Cl.
*B60C 29/06* (2006.01)
*B65D 5/50* (2006.01)
(Continued)

(52) U.S. Cl.
CPC .......... *B60C 29/062* (2013.04); *B29C 73/025* (2013.01); *B60C 25/16* (2013.01); *B65D 5/5007* (2013.01);
(Continued)

(58) Field of Classification Search
CPC .......... B65D 5/36; B65D 5/3607; B65D 5/42; B65D 5/4204; B65D 5/4266
(Continued)

(56) References Cited

U.S. PATENT DOCUMENTS 2,006,475 A * 7/1935 O'Reilly ............ B65D 71/0003
206/168
2,358,523 A * 9/1944 McKinley .............. B65D 5/001
206/194
(Continued)

FOREIGN PATENT DOCUMENTS

JP   S60-142718   9/1985
JP   H04-027769   3/1992
(Continued)

OTHER PUBLICATIONS

International Search Report for International Application Serial No. PCT/JP2013/055288 dated Apr. 9, 2013, 4 pages, Japan.

*Primary Examiner* — Timothy L Maust
(74) *Attorney, Agent, or Firm* — Thorpe North & Western

(57) ABSTRACT

A packaging box is provided for individually packaging a container for tire repair fluid. The box has six outer walls that surround the container. A container holder for holding the container upright is provided in any one of the outer walls. The container holderholder is formed by deforming the outer wall. The container is removed from the packaging box, the outer wall of the packaging box is deformed to form the container holder. The container holder is used to hold the container upright. A first hose is connected between a tire valve of a wheel on which a pneumatic tire is mounted and an outlet of the container. A second hose is connected between an inlet of the container and an air compressor. The air compressor is operable to inject the tire repair fluid in the container into the pneumatic tire using the pressure of compressed air.

8 Claims, 6 Drawing Sheets

(51) Int. Cl.
   *B29C 73/02* (2006.01)
   *B60C 25/00* (2006.01)
   *B29C 73/16* (2006.01)
   *B29L 30/00* (2006.01)

(52) U.S. Cl.
   CPC .......... *B65D 5/5019* (2013.01); *B29C 73/166* (2013.01); *B29L 2030/00* (2013.01)

(58) Field of Classification Search
   USPC ...... 141/38; 229/104, 117.31, 122; 206/193, 206/194, 495, 777; 220/531
   See application file for complete search history.

(56) References Cited

U.S. PATENT DOCUMENTS

| | | | | |
|---|---|---|---|---|
| 2,682,949 | A * | 7/1954 | Whitehead | B65D 5/5014 206/446 |
| 2,828,047 | A * | 3/1958 | Weiselberg | B65D 71/0029 126/9 A |
| 3,179,323 | A * | 4/1965 | Miller | B65D 1/0292 220/23.87 |
| 3,780,906 | A * | 12/1973 | Katzenmeyer | B65D 71/004 206/170 |
| 4,054,203 | A * | 10/1977 | Farquhar | B65D 5/5014 206/277 |
| 4,069,917 | A * | 1/1978 | Stollberg | B65D 85/52 206/423 |
| 4,088,262 | A * | 5/1978 | Kuehlhorn | B65D 5/4608 206/194 |
| 4,143,768 | A * | 3/1979 | McCulloch | B65D 77/065 206/590 |
| 4,234,081 | A * | 11/1980 | Champlin | B65D 71/36 206/147 |
| 4,394,903 | A * | 7/1983 | Bakx | B65D 71/36 206/158 |
| 4,601,390 | A * | 7/1986 | Rosenthal | B65D 71/0022 206/175 |
| 5,996,804 | A * | 12/1999 | Kuhn | B65D 5/5014 206/193 |
| 6,945,404 | B2 * | 9/2005 | Messinger | B65D 5/0236 206/446 |
| 2007/0119724 | A1 * | 5/2007 | Navarro Quesada | B65D 71/0022 206/193 |

FOREIGN PATENT DOCUMENTS

| | | |
|---|---|---|
| JP | 2008-155400 | 7/2008 |
| JP | 4466777 | 5/2010 |
| JP | 4466778 | 5/2010 |
| JP | 2011-068375 | 4/2011 |
| JP | 2011-219103 | 11/2011 |

* cited by examiner

TIRE REPAIR FLUID CONTAINER PACKAGING BOX AND METHOD OF INJECTING TIRE REPAIR FLUID

TECHNICAL FIELD

The present technology relates to a packaging box for individually packaging a tire repair fluid container and a method of injecting tire repair fluid utilizing the same, and more specifically to a packaging box for tire repair fluid container and a method of injecting tire repair fluid that allow tire repair fluid container to be easily held when performing tire repair work.

BACKGROUND

In recent years, when a tire mounted on a vehicle has punctured, a tire repair fluid is injected into the tire via a tire valve to temporarily repair the puncture while the tire is simultaneously filled with air.

A tire repair fluid injector device comprises a container for containing tire repair fluid, an air compressor, and hoses for connecting the container and the air compressor to a tire valve.

When repairing a tire using such a tire repair fluid injector device, a first hose is connected between an outlet of the container and the tire valve while a second hose is connected between an inlet of the container and the air compressor, after which the air compressor is operated, thereby injecting the tire repair fluid in the container into a pneumatic tire using the pressure of compressed air. However, if the tire repair fluid container falls over while tire repair fluid is being injected into the tire using compressed air, the problem occurs that only compressed air, and no tire repair fluid, is injected into the tire. Thus, provisions to keep the tire repair fluid container from falling over are necessary.

By contrast, an arrangement in which a pair of surface fasteners are attached to the outer surface of the air compressor and the outer surface of the tire repair fluid container, and the pair of surface fasteners are used to anchor the tire repair fluid container to the air compressor has been proposed (see, for example, Japanese Patent No. 4466778). An arrangement in which a flat surface is formed on the air compressor while a suction cup is provided on the tire repair fluid container, and the suction cup is attached to the flat surface of the air compressor to anchor the tire repair fluid container to the air compressor has also been proposed (see, for example, Japanese Patent No. 4466777).

However, while the anchoring methods described above are effective when the air compressor and the tire repair fluid container are provided in a set, they are not necessarily useful if the air compressor and the tire repair fluid container are provided separately.

SUMMARY

The present technology provides a packaging box for tire repair fluid container and a method of injecting tire repair fluid that allow tire repair fluid container to be easily held when performing tire repair work.

A tire repair fluid container packaging box according to the present technology is a packaging box for individually packaging a container for tire repair fluid, wherein the box has six outer walls that surround the container, in any one of which outer walls is provided a container holder for holding the container upright, the container holder being formed by deforming the outer wall.

A method of injecting tire repair fluid according to the present technology is a method of injecting tire repair fluid using: a packaging box having six outer walls that surround the container for tire repair fluid and a container holder for holding the container upright provided in any one of the outer walls, the container holder being formed by deforming the outer wall; a container that contains tire repair fluid and is individually packaged in the packaging box; and an air compressor, the method including the steps of: removing the container from the packaging box; forming the container holder by deforming the outer wall of the packaging box; holding the container upright by using the container holder; connecting a first hose between a tire valve of a wheel on which a pneumatic tire is mounted and an outlet of the container; connecting a second hose between an inlet of the container and the air compressor; and injecting the tire repair fluid in the container into the pneumatic tire using the pressure of compressed air by operating the air compressor In the present technology, a container holder for holding the container upright is formed on any one of the outer walls of the tire repair fluid container packaging box, and the container holder is formed by deforming the outer wall, thereby making it possible to form the container holder by deforming the outer wall of the packaging box after removing the container from the packaging box and hold the container upright using the container holder. This makes it possible to easily hold the tire repair fluid container when repairing a tire using the air compressor. As a result, the tire repair fluid container can be kept from falling over, allowing the work of repairing the tire to proceed unimpeded.

In the present technology, the container holder is preferably a container holding hole into which the container is received. A container holding hole is easy to process, and allows the tire repair fluid container to be effectively prevented from falling over.

If the container holder takes the form of a container holding hole, it is preferable that a hole formation area corresponding to the container holding hole be pre-provided in the outer wall, and the hole formation area be opened to form the container holding hole. In particular, if perforations are provided around an outer edge of the hole formation area, the container holding hole can easily be opened by tearing open the perforations. If a folding groove is provided at a portion of the outer edge of the hole formation area, and perforations are provided along the rest of the outer edge of the hole formation area, the portion left after tearing open the perforations can be folded along the folding groove to form a folded flap serving as an auxiliary member for holding the container upright. Similarly, if a folding groove is provided on the outer edge of the hole formation area, and a plurality of lines of perforations traversing the hole formation area is formed in the hole formation area, the portions left after tearing open the perforations can be folded along the folding groove to form folded flaps serving as auxiliary members for holding the container upright.

A configuration in which another outer wall adjacent to the outer wall in which the container holding hole is formed constitutes an opening flap, and a pair of inner flaps provided on the frame of the opening flap contact the container and hold the container upright is preferable. This allows the inner flaps to function as auxiliary members for holding the container upright.

It is more preferable that another outer wall adjacent to the outer wall in which the container holding hole is formed constitute an opening flap, and yet another outer wall opposing the outer wall in which the container holding hole is formed be connected to the opening flap. This allows the container to be securely held by opening the opening flap and placing a weighty object such as an air compressor upon the opening flap.

DETAILED DESCRIPTION

Figure 1:
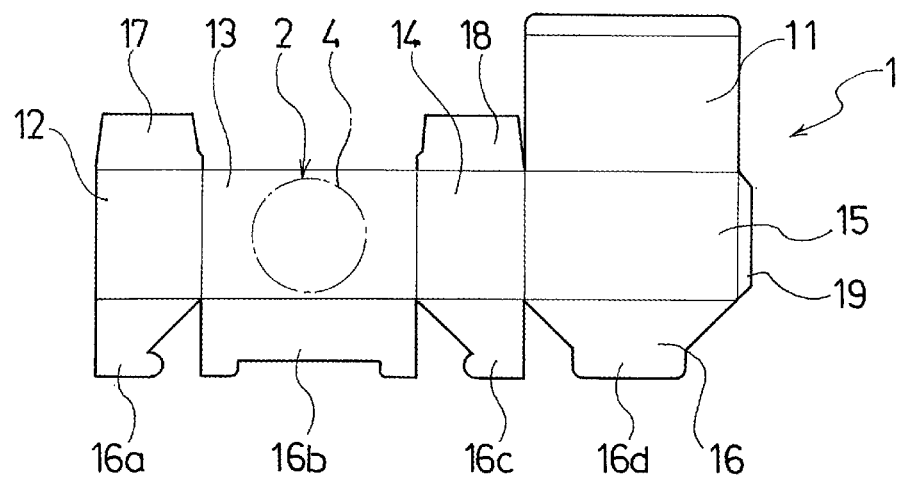
FIG. 1 is an unfolded view of a tire repair fluid container packaging box according to an embodiment of the present technology.
Figure 2:
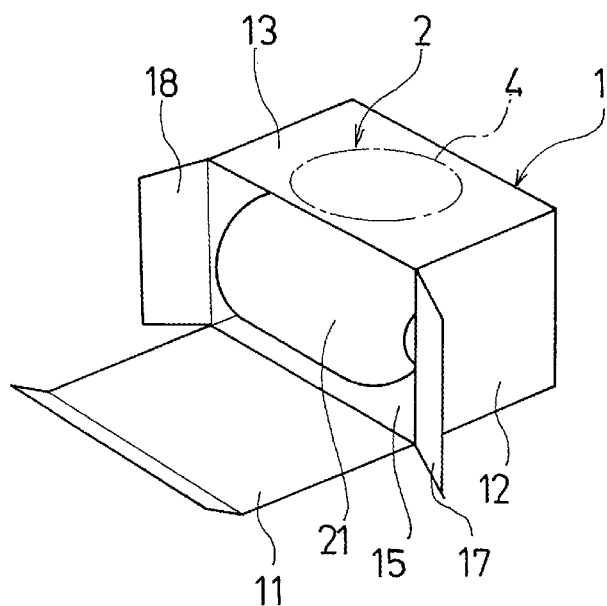
FIG. 2 is a perspective view of the packaging box illustrated in FIG. 1 assembled with a tire repair fluid container inserted therein.

The following is a detailed description of the configuration of the present technology with reference to the accompanying drawings. FIGS. 1 to 4 illustrate a tire repair fluid container packaging box according to an embodiment of the present technology. As illustrated in FIG. 1, a tire repair fluid container packaging box 1 is a packaging box for individually packaging a tire repair fluid container 21 (see FIG. 2), and has six outer walls 11 to 16 surrounding the container 21. The outer wall 11 constitutes an opening flap, the outer walls 12 to 15 are disposed at positions adjacent to the outer wall 11, and the outer wall 16 is disposed at a position opposing the outer wall 11. The outer wall 16 is made up of a plurality of separate flaps 16a to 16d, which are assembled to form the outer wall 16. Inner flaps 17, 18 are provided on the outer walls 12, 14, and a bonding flap 19 is provided on the outer wall 15. The unfolded structure of the packaging box 1 is not limited to the embodiment described above as long as the box has six outer walls 11 to 16.

A container holder 2 for holding the container 21 upright is provided in the outer wall 13 out of the outer walls 11 to 16. The container holder 2 is formed by deforming the outer wall 13. More specifically, a container holding hole 3 (see FIG. 3) is formed as the container holder 2. In other words, a hole formation area 4 corresponding to the container holding hole 3 is pre-provided in the outer wall 13, and the container holding hole 3 is formed by opening the hole formation area 4.

Figure 4:
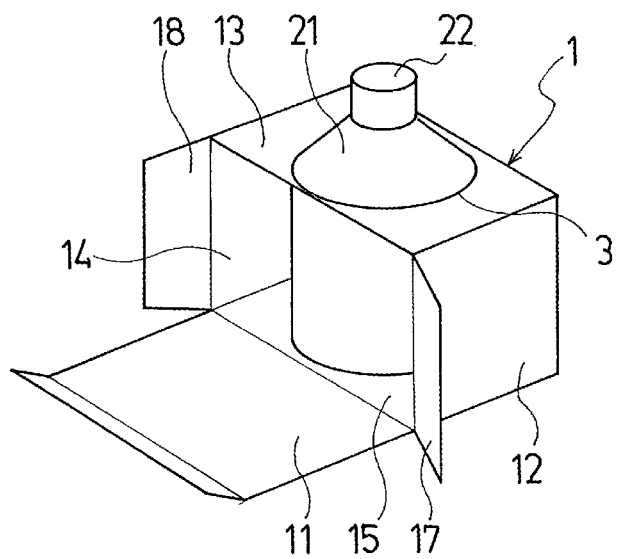
FIG. 4 is a perspective view of the packaging box illustrated in FIG. 1 being used to hold a tire repair fluid container upright.

The packaging box 1 described above is used to individually package the tire repair fluid container 21, but, because the container holding hole 3 (container holder 2) for holding the container 21 upright is provided in the outer wall 13, and the container holding hole 3 is configured to be formed by deforming the outer wall 13, the container holding hole 3 can be formed by deforming the outer wall 13 of the packaging box 1 after removing the container 21 from the packaging box 1 so as to hold the container 21 upright using the container holding hole 3, as illustrated in FIG. 4. When the container 21 is being held upright, the outer wall 11 constituting the opening flap may be kept closed or open. In FIG. 4, a protective cap 22 is attached to the container 21; this protective cap 22 is removed when repairing a tire.

Figure 5:
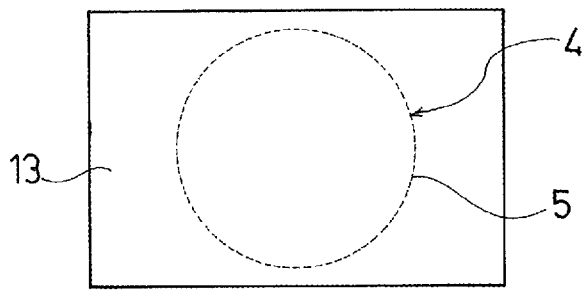
FIG. 5 is a plan view illustrating an example of a hole formation area corresponding to a container holding hole formed in the tire repair fluid container packaging box according to the present technology.

FIGS. 5 to 8 each illustrate examples of hole formation areas corresponding to the container holding hole formed in the tire repair fluid container packaging box according to the present technology. In FIG. 5, perforations 5 (intermittent cuts) are formed along the entire circumference of the outer edge of the hole formation area 4. In this case, the container holding hole 3 can easily be opened by tearing open the perforations 5.

Figure 6:
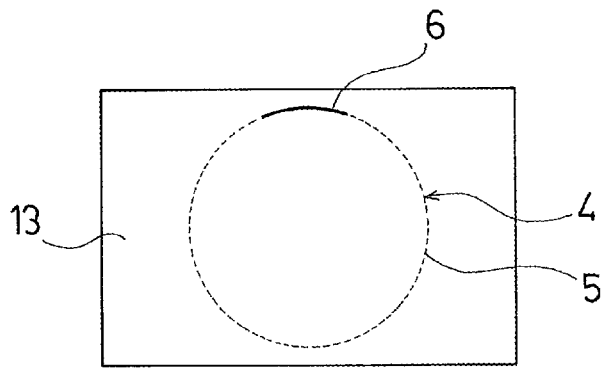
FIG. 6 is a plan view illustrating a modified example of a hole formation area corresponding to a container holding hole formed in the tire repair fluid container packaging box according to the present technology.
Figure 7:
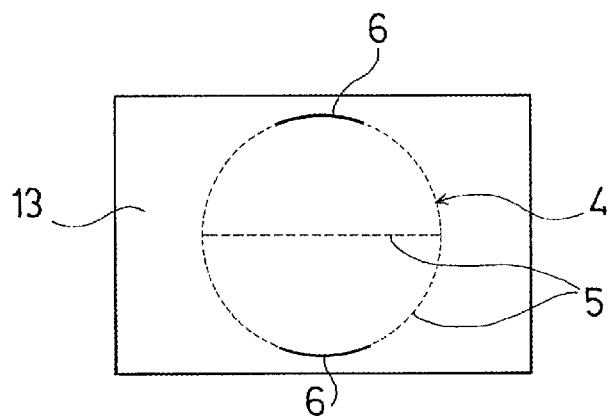
FIG. 7 is a plan view illustrating another modified example of a hole formation area corresponding to a container holding hole formed in the tire repair fluid container packaging box according to the present technology.
Figure 8:
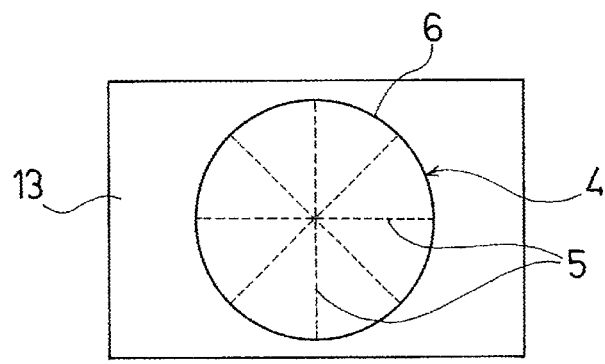
FIG. 8 is a plan view illustrating yet another modified example of a hole formation area corresponding to a container holding hole formed in the tire repair fluid container packaging box according to the present technology.

In FIG. 6, a folding groove 6 is formed in a portion of the outer edge of the hole formation area 4, and perforations 5 are formed along the remainder of the outer edge of the hole formation area 4. In FIG. 7, a pair of folding grooves 6 is formed at opposing positions on the outer edge of the hole formation area 4, and perforations 5 are formed along the remainder of the outer edge of the hole formation area 4. In FIG. 8, a folding groove 6 is formed along the entire circumference of the outer edge of the hole formation area 4, and a plurality of lines of perforations 5 traversing the hole formation area 4 are formed in the hole formation area 4. In the structures shown in FIGS. 6 to 8, the portions formed by tearing along the perforations 5 are folded into the packaging box 1 along the folding groove 6 so that the folded flaps function as auxiliary members for holding the container 21 upright. Because the portion in the hole formation area 4 is not completely removed from the outer wall 13 of the packaging box 1, but remains integral with the packaging box 1, there is the advantage that no loose bits of rubbish are scattered.

Figure 9:
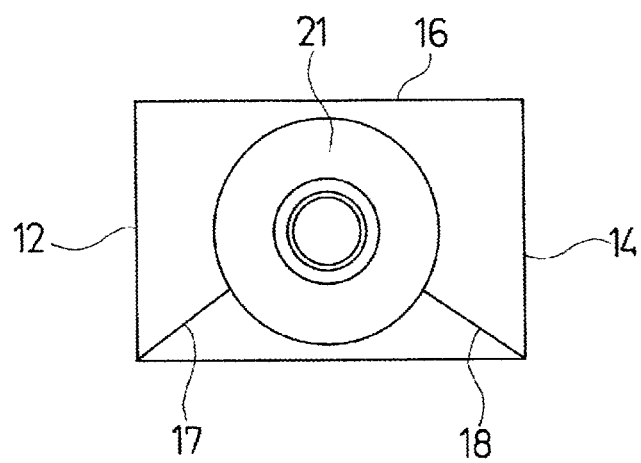
FIG. 9 is a plan view illustrating an example of inner flaps formed in the tire repair fluid container packaging box according to the present technology.
Figure 10:
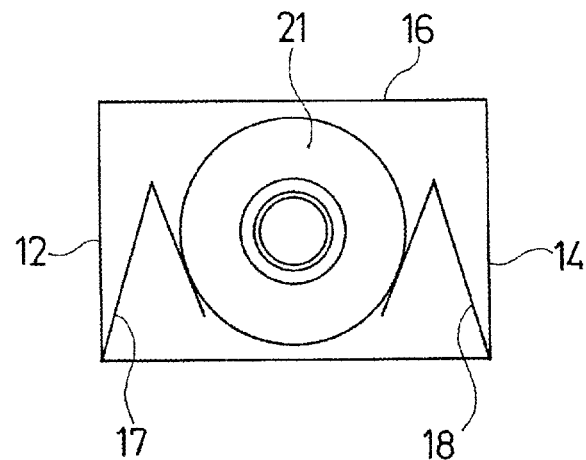
FIG. 10 is a plan view illustrating a modified example of inner flaps formed in the tire repair fluid container packaging box according to the present technology.
Figure 11:
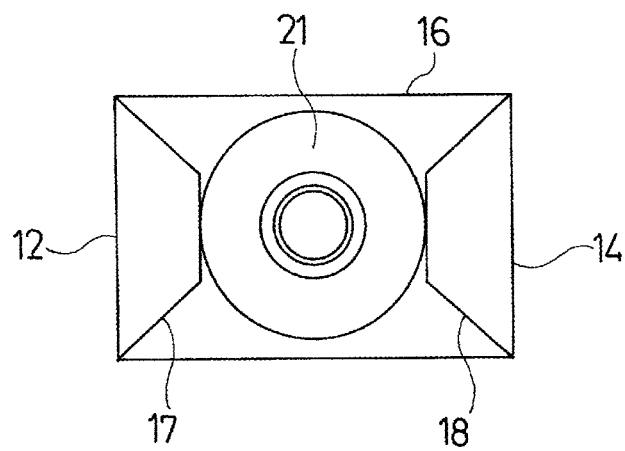
FIG. 11 is a plan view illustrating another modified example of inner flaps formed in the tire repair fluid container packaging box according to the present technology.

FIGS. 9 to 12 each illustrate examples of inner flaps formed in the tire repair fluid container packaging box according to the present technology. In the embodiment described above, the outer wall 11 adjacent to the outer wall 13 in which the container holding hole 3 is formed constitutes an opening flap, and the pair of inner flaps 17, 18 is provided on the frame of the opening flap. In FIG. 9, the tips of the pair of inner flaps 17, 18 contact the container 21, holding the container 21 upright, when the flaps are pressed into the packaging box 1. In FIG. 10, the pair of inner flaps 17, 18 each comprise a bent section, and are elastically pressed against the container 21, holding the container 21 upright, when the flaps are pressed into the packaging box 1. In FIG. 11, the pair of inner flaps 17, 18 each comprise two bent sections, and form a bridge-like structure along the outer walls 12, 14 when the flaps are pressed into the packaging box 1, thereby holding the container 21 upright. In the structures illustrated in FIGS. 9 to 11, the inner flaps 17, 18 function as auxiliary members for holding the container 21 upright.

Figure 12:
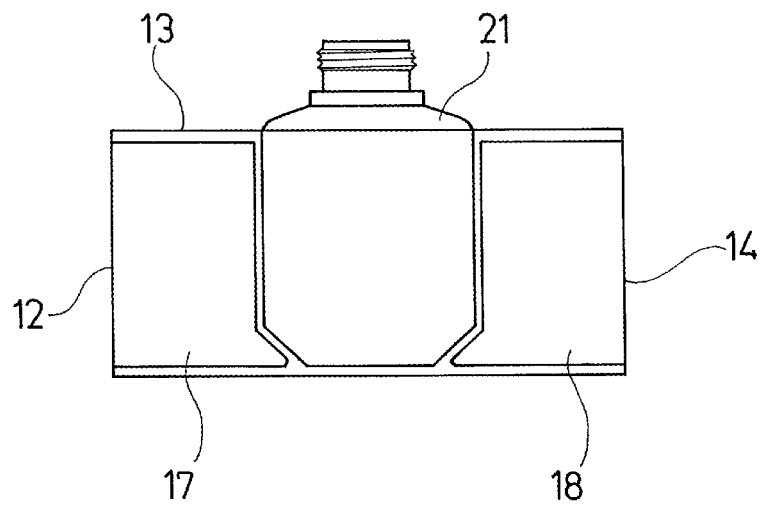
FIG. 12 is a side view illustrating yet another modified example of inner flaps formed in the tire repair fluid container packaging box according to the present technology.

In FIG. 12, the pair of inner flaps 17, 18 have a shape conforming to the side walls of the container 21. This allows the container 21-holding effects yielded by the inner flaps 17, 18 to be further improved.

Figure 13:
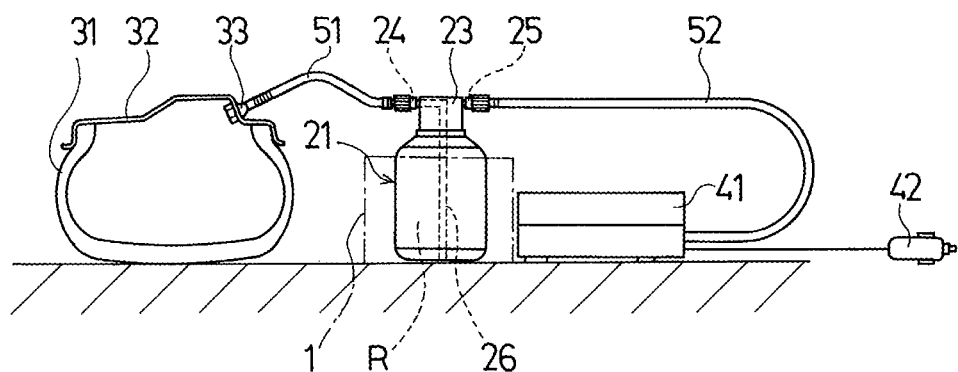
FIG. 13 is a side view of illustrating a method of injecting tire repair fluid using the tire repair fluid container packaging box according to the present technology.

FIG. 13 illustrates a method of injecting tire repair fluid using the tire repair fluid container packaging box according to the present technology. In FIG. 12, 31 is a pneumatic tire, 32 is a wheel, and 33 is a tire valve attached to the wheel.

As illustrated in FIG. 13, the tire repair fluid injector device is provided with the packaging box 1 described above, a container 21, individually packaged in the packaging box 1, that contains tire repair fluid R, an injection cap 23 fitted to an opening in the container 21, an air compressor 41 for supplying compressed air, and hoses 51, 52 for connecting the container 21 and the air compressor 41 to a tire valve 33. An outlet 24 for ejecting tire repair fluid R and an inlet 25 into which compressed air is taken are provided in the injection cap 23, and an inner tube 26 extending to the bottom of the container 21 is connected to the outlet 24.

Figure 3:
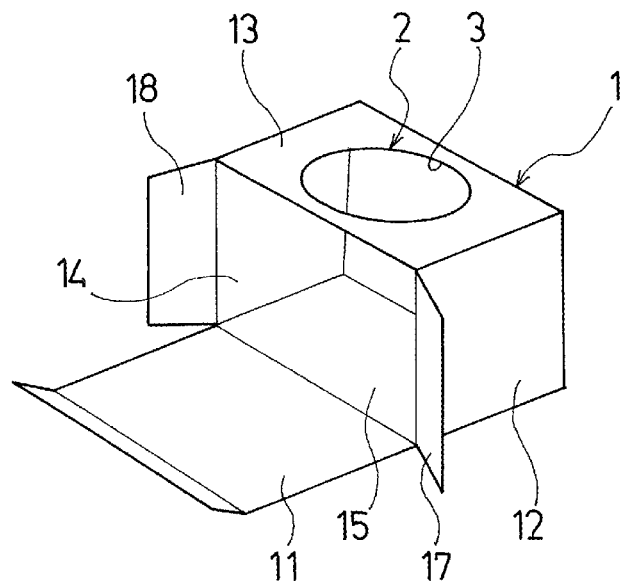
FIG. 3 is a perspective view of the packaging box illustrated in FIG. 1 with a container holder formed therein.

When repairing a tire, the packaged container 21 is first removed from the packaging box 1, and the injection cap 23 is fitted on the opening of the container 21 in place of the protective cap 22. At this time, a sealing film adhered over the opening of the container 21 is opened as appropriate. Next, as illustrated in FIG. 3, the outer wall 13 of the packaging box 1 is deformed to form the container holding hole 3 (container holder 2), and the container 21 is held upright by the container holding hole 3. Next, as illustrated in FIG. 13, the hose 51 is connected between the tire valve 33 and the outlet 24 of the container 21, while the hose 52 is connected between the inlet 25 of the container 21 and the air compressor 41. A plug 42 of the air compressor 41 is then connected to a power source and the air compressor 41 is operated, thereby injecting the tire repair fluid R in the container 21 into a pneumatic tire 31 using the pressure of compressed air, and the interior of the pneumatic tire 31 remains filled with compressed air after injection is complete.

After the container 21 is removed from the packaging box 1, the outer wall 13 of the packaging box 1 is deformed to form the container holding hole 3 and the container 21 is held upright by the container holding hole 3, thereby allowing the tire repair fluid container 21 to be easily held in place when repairing a tire using the air compressor 41. As a result, the tire repair fluid container 21 can be kept from falling over, allowing the work of repairing the tire to proceed unimpeded. In particular, by imparting the packaging box 1, which previously only functioned as packaging, with a container-holding function, the need to provide a separate tool for holding the container is eliminated, contributing to reducing the weight of the vehicle.

If the outer wall 11 adjacent to the outer wall 13 in which the container holding hole 3 is formed constitutes an opening flap, and the opening flap is connected to the outer wall 15 opposite the outer wall 13 in which the container holding hole 3 is formed, as illustrated in FIG. 4, it is preferable that the opening flap formed by the outer wall 11 be kept open and the outer wall 11 kept in contact with the ground while the tire is being repaired. This allows the container 21 to be securely held by placing a weighty object, such as the air compressor, upon the opening flap constituted by the outer wall 11. Naturally, the opening flap constituted by the outer wall 11 may also be held down by a foot while the tire is being repaired. If the opening flap constituted by the outer wall 11 is kept open, the inner flaps 17, 18 are preferably used as auxiliary members for holding the container 21 upright.

In the embodiment described above, a container holding hole is used as the container holder, but the present technology may also be provided with a cutout functioning similar to a container holding hole in any one of the outer walls as a container holder. The container holder may also be formed across a plurality of outer walls.

What is claimed is:

1. A method of injecting tire repair fluid using: a packaging box having six outer walls that surround the container for tire repair fluid and a container holder for holding the container upright provided in any one of the outer walls, the container holder being formed by deforming the outer wall; a container that contains tire repair fluid and is individually packaged in the packaging box; and an air compressor, the method comprising the steps of:

removing the container from the packaging box;

forming the container holder by deforming the outer wall of the packaging box;

holding the container upright by using the container holder;

connecting a first hose between a tire valve of a wheel on which a pneumatic tire is mounted and an outlet of the container;

connecting a second hose between an inlet of the container and the air compressor; and injecting the tire repair fluid in the container into the pneumatic tire using the pressure of compressed air by operating the air compressor.

2. The method of injecting tire repair fluid according to claim 1, wherein the container holder is a container holding hole into which the container is received.

3. The method of injecting tire repair fluid according to claim 2, further comprising pre-providing a hole formation area corresponding to the container holding hole in the outer wall, and forming the container holding hole by opening the hole formation area.

4. The method of injecting tire repair fluid according to claim 3, further comprising providing perforations along an outer edge of the hole formation area.

5. The method of injecting tire repair fluid according to claim 3, further comprising forming a folding groove along a portion of the outer edge of the hole formation area, and providing perforations along the remainder of the outer edge of the hole formation area.

6. The method of injecting tire repair fluid according to claim 3, further comprising forming a folding groove along the outer edge of the hole formation area, and providing a plurality of lines of perforations traversing the hole formation area in the hole formation area.

7. The method of injecting tire repair fluid according to claim 2, wherein another outer wall adjacent to the outer wall in which the container holding hole is formed constitutes an opening flap, and a pair of inner flaps provided on a frame of the opening flap contact the container and hold the container upright.

8. The method of injecting tire repair fluid according to claim 2, wherein another outer wall adjacent to the outer wall in which the container holding hole is formed constitutes an opening flap, and the opening flap is connected to yet another outer wall opposite the outer wall in which the container holding hole is formed.

* * * * *